(12) United States Patent
Schoenherr

(10) Patent No.: US 12,409,907 B2
(45) Date of Patent: Sep. 9, 2025

(54) METHOD AND DRIVER ASSISTANCE SYSTEM FOR OPERATING A VEHICLE

(71) Applicant: Robert Bosch GmbH, Stuttgart (DE)

(72) Inventor: Michael Schoenherr, Renningen-Malmsheim (DE)

(73) Assignee: ROBERT BOSCH GMBH, Stuttgart (DE)

(\*) Notice: Subject to any disclaimer, the term of this patent is extended or adjusted under 35 U.S.C. 154(b) by 162 days.

(21) Appl. No.: 18/363,837

(22) Filed: Aug. 2, 2023

(65) Prior Publication Data

US 2024/0092446 A1  Mar. 21, 2024

(30) Foreign Application Priority Data

Sep. 15, 2022 (DE) ...................... 10 2022 209 678.9

(51) Int. Cl.
*B62J 45/20* (2020.01)
*B60T 8/17* (2006.01)
*B62K 11/00* (2006.01)

(52) U.S. Cl.
CPC ............ *B62J 45/20* (2020.02); *B60T 8/1706* (2013.01); *B62K 11/00* (2013.01)

(58) Field of Classification Search
CPC ..... B62J 45/20; B60T 8/1706; B60T 2201/16; B60T 2210/32; B60T 7/22; B60T 8/3225; B62K 11/00; B60K 31/0066; B60K 31/0008; B60K 31/0075; B60K 31/12; B60W 2552/20; B60W 2552/30; B60W 30/09; B60W 30/18145; B60W 40/072; B60W 30/16; B60W 2300/36
See application file for complete search history.

(56) References Cited

U.S. PATENT DOCUMENTS

| | | | |
|---|---|---|---|
| 5,771,007 A * | 6/1998 | Arai | B60K 31/0008 180/170 |
| 7,831,367 B2 * | 11/2010 | Heinrichs-Bartscher | B60W 30/16 701/96 |
| 10,896,606 B1 * | 1/2021 | Hayes | G05D 1/0022 |
| 2005/0010351 A1 * | 1/2005 | Wagner | B60T 7/22 180/170 |
| 2005/0216169 A1 * | 9/2005 | Arai | B60W 30/16 180/170 |
| 2008/0078600 A1 * | 4/2008 | Inoue | B60W 30/16 180/170 |
| 2015/0081189 A1 * | 3/2015 | Fairgrieve | B60W 30/16 701/96 |
| 2017/0361841 A1 * | 12/2017 | Kojo | B60W 30/165 |
| 2018/0043793 A1 * | 2/2018 | Herb | B60W 10/08 |
| 2018/0178714 A1 * | 6/2018 | Fujii | B60W 30/16 |

(Continued)

FOREIGN PATENT DOCUMENTS

| | | |
|---|---|---|
| DE | 202015002817 U1 | 7/2016 |
| EP | 3335953 A1 | 6/2018 |
| WO | 2021090233 A1 | 5/2021 |

*Primary Examiner* — Sze-Hon Kong
(74) *Attorney, Agent, or Firm* — NORTON ROSE FULBRIGHT US LLP

(57) ABSTRACT

A method for operating a vehicle with a driver assistance system. A distance function of the driver assistance system regulates a distance from a preceding target object using system interventions in a brake system and/or a drive system of the vehicle to a speed-dependent safety distance, wherein the distance function is degraded during cornering of the vehicle.

9 Claims, 1 Drawing Sheet

(56) References Cited

U.S. PATENT DOCUMENTS

| | | | |
|---|---|---|---|
| 2018/0198955 A1* | 7/2018 | Watanabe | B60K 35/00 |
| 2019/0283770 A1* | 9/2019 | Kubota | B60W 50/082 |
| 2020/0094830 A1* | 3/2020 | Ito | G05D 1/0291 |
| 2020/0180623 A1* | 6/2020 | Bohrer | B60W 30/162 |
| 2022/0161788 A1* | 5/2022 | Tamashima | B60W 30/12 |
| 2022/0340131 A1* | 10/2022 | Ito | G06V 20/58 |

* cited by examiner

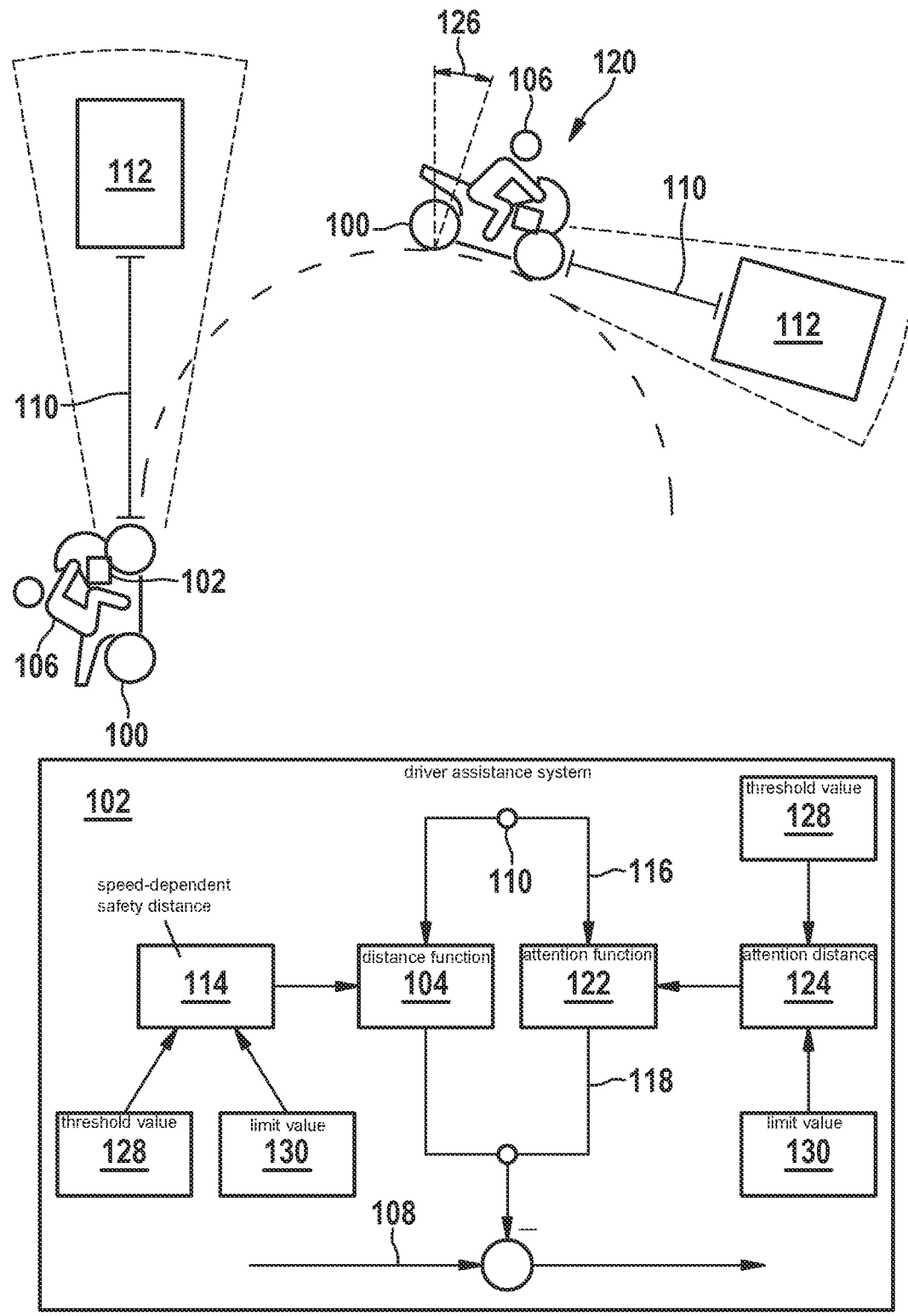

METHOD AND DRIVER ASSISTANCE SYSTEM FOR OPERATING A VEHICLE

CROSS REFERENCE

The present application claims the benefit under 35 U.S.C. § 119 of German Patent Application No. DE 10 2022 209 678.9 filed on Sep. 15, 2022, which is expressly incorporated herein by reference in its entirety.

FIELD

The present invention relates to a method for operating a vehicle with a driver assistance system, a corresponding driver assistance system and a corresponding computer program product.

BACKGROUND INFORMATION

A dynamic driver assistance system of a vehicle can maintain a speed-dependent safety distance from a preceding vehicle via system interventions in a drive system of the vehicle and/or a brake system of the vehicle. For this purpose, a drive torque can be reduced and/or a braking torque can be increased if a distance between the vehicles approaches the safety distance. If the distance is large enough, the driver assistance system can monitor the distance without intervening. As a result, the vehicle can be operated conventionally by means of an accelerator pedal and a brake pedal, as long as the distance is greater than the safety distance. However, if the vehicle approaches the preceding vehicle in such a way that the distance would fall below the safety distance for the driven speed, the driver assistance system intervenes with the system interventions and decelerates the vehicle in such a way that the safety distance is maintained.

SUMMARY

The present invention provides a method for operating a vehicle with a driver assistance system, a corresponding driver assistance system, and a corresponding computer program product. Advantageous embodiments, developments, and improvements of the present invention here emerge from the disclosure herein.

According to an example embodiment of the present invention, a dynamic driver assistance system of a vehicle continuously monitors a distance of the vehicle from a preceding vehicle. Thus, in the event of an impermissible proximity to another vehicle, the driver assistance system of the vehicle can trigger at least one low-threshold system intervention on the brake and/or the drive, if a driver of the vehicle is briefly distracted or the driver incorrectly estimates the distance. The low-threshold system intervention results in a jerk noticeable to the driver. Thus, the attention of the driver is again fully directed to a traffic situation around the vehicle. The vehicle can in particular be a two-wheeler. Due to the small mass of the two-wheeler, the jerk can be felt clearly.

If there is then no intervention by the driver to increase the distance or to reduce a proximity to the preceding vehicle, the driver assistance system can brake the vehicle via stronger system interventions, so that the safety distance is maintained.

In particular in the case of a two-wheeler, the attention of the driver can decrease predominantly while driving straight ahead. The driver assistance system can then fully deploy its advantages and alert the driver of an impermissible proximity. During cornering, however, the driver is focused such that he himself has control over the distance from the preceding vehicle at all times. During cornering, the distance can also fall significantly below the safety distance actually required for the driven speed without there being an increased risk of collision. Particularly in the case of very tight corners, a very close proximity to the preceding vehicle can occur, since the preceding vehicle decelerates strongly starting from a brake application point of the corner and accelerates correspondingly strongly again approximately at an apex of the corner. The driver can exploit this existing prior knowledge and travel very close to the preceding vehicle shortly before the apex.

In accordance with an example embodiment of the present invention, a distance function of the dynamic driver assistance system is at least attenuated during cornering of the vehicle. This results in later and/or weaker system interventions during cornering. In addition, annoyance of the driver by the system interventions during cornering can be avoided.

According to an example embodiment of the present invention, a method for operating a vehicle with a driver assistance system is provided, wherein a distance function of the driver assistance system regulates a distance from a preceding target object using system interventions in a brake system and/or a drive system of the vehicle to a speed-dependent safety distance, wherein the distance function is degraded during cornering of the vehicle.

Ideas for embodiments of the present invention may be considered, inter alia, as being based on the concepts and findings described below.

A driver assistance system can be integrated into a control device of a vehicle. The vehicle can in particular be a two-wheeler or motorcycle. The driver assistance system can process sensor information and generate control signals. In particular, the driver assistance system can process sensor signals from at least one distance sensor of the vehicle and provide control signals for a drive system of the vehicle and alternatively or additionally for a brake system of the vehicle. The control signals activate a system intervention in the vehicle. The system intervention can result in particular in a deceleration of the vehicle.

The control signals can, for example, request a reduced drive torque and/or an increased braking torque to decelerate the vehicle. In this case, the vehicle can be decelerated both by reducing the drive torque and by increasing the braking torque or a combination thereof.

The distance sensor can detect a detection region in front of the vehicle and describe a distance from objects in the detection region in distance information. The distance sensor can be, for example, a radar sensor, a lidar sensor or a camera. The distance can be described as a time gap. The time gap corresponds to a time period between a time at which a preceding object drives past a defined point and the time at which the vehicle drives past the same point. The distance from the preceding object thus results from a speed of the vehicle.

The distance sensor can have a reduced detection performance during cornering of the vehicle. In particular, a reference plane of the detection region can be oriented obliquely to a contact area of the two-wheeler by a tilt of a two-wheeler during cornering. The reference plane can approximately correspond to the contact area when the two-wheeler is upright. As a result, the distance sensor can detect new objects on the contact area at a short distance from the two-wheeler, in particular on the inside of a corner when entering the corner, which objects do not actually have any significance for the two-wheeler, however. In unfavorable situations, such objects can be interpreted as moving objects and lead to unfounded system interventions. As a result of the inclination of the reference plane with respect to the contact area, objects actually present on the outside of a corner can also disappear from the detection region and no longer be detected. In particular when exiting a corner, these objects can then suddenly be detected again and cause annoying system interventions.

According to an example embodiment of the present invention, a speed-dependent safety distance becomes greater with increasing speed. The safety distance can be described particularly simply by a constant safety time gap. The safety time gap can be independent of the current speed of the vehicle. At low speed, a small safety distance results from the safety time gap. At high speed, a large safety distance results from the safety time gap.

The safety distance or the safety time gap can be influenced by a driver of the vehicle. In this case, the driver can select, for example, via an operator interface whether a greater safety time gap or a greater safety distance or a smaller safety time gap or a smaller safety distance is used. The safety distance or the safety time gap cannot be selected to be smaller than a minimum required value. The safety distance or the safety time gap can also be influenced by means of an accelerator pedal or a throttle grip of the two-wheeler.

According to an example embodiment of the present invention, a distance function of the driver assistance system can compare the measured time gap from a preceding vehicle with the safety time gap or compare the measured distance with the speed-dependent safety distance. If a difference between the time gap and the safety time gap becomes smaller, the driver assistance system can trigger a system intervention in order to decelerate the vehicle. The system intervention changes the difference between the time gap and the safety time gap more slowly. The time gap can thus approach the safety time gap more slowly. The system intervention can be repeated or continued until the time gap lies within a tolerance range around the safety time gap and the vehicle travels at substantially the same speed behind the preceding object.

Cornering can be detected using sensor signals of the vehicle. Cornering can be detected using a steering angle signal. Cornering can alternatively or additionally be detected using inertial sensor signals, such as acceleration signals and/or rotation rate signals. Acceleration signals can, for example, describe a centrifugal force resulting from cornering. Rotation rate signals can, for example, describe tilting of a two-wheeler into the corner. During cornering, the driver is focused and requires at least less assistance to operate the vehicle safely.

The distance function can be degraded via a ramp. Thus, a sudden change in the distance function can be avoided when cornering is detected. Likewise, the distance function can be increased again via a ramp at the end of the cornering. In other words, the distance function can be ramped down and up.

The safety distance can be reduced during cornering. If cornering is detected, a reduced set point for the safety distance can be used. Due to the reduced safety distance, the vehicle can drive closer to the preceding vehicle during cornering before the system interventions are triggered.

Alternatively or additionally, according to an example embodiment of the present invention, the system interventions can be attenuated during cornering. If cornering is detected and the distance falls below the safety distance, deceleration can be carried out less strongly. As a result of attenuated system interventions, the distance can be smaller than the safety distance.

According to an example embodiment of the present invention, an attention function of the driver assistance system can direct the attention of a driver of the vehicle to a traffic situation by using low-threshold system interventions in the brake system and/or the drive system when the distance falls below a speed-dependent attention distance. The attention function can also be degraded during cornering. Low-threshold system interventions can be easily noticeable for the driver due to the resulting jerk, without causing a significant change in speed of the vehicle. When driving straight ahead, the driver can feel the low-threshold system interventions and adapt his behavior in such a way that the system interventions stop. Since the driver is focused on driving through the corner, even the low-threshold system intervention can disturb his concentration. Rather, the driver can be distracted by the system intervention and ultimately drive through the corner less safely. By attenuating the system interventions during cornering, the driver can concentrate fully on cornering. A speed-dependent attention distance can be described by a speed-independent attention time gap.

According to an example embodiment of the present invention, the attention distance can be reduced during cornering. If cornering is detected, a reduced set point for the attention distance can be used. Due to the reduced attention distance, the vehicle can drive closer to the preceding vehicle during cornering before the low-threshold system interventions are triggered.

The distance function or the attention function can be degraded according to a tilt of a two-wheeler. Cornering can be detected on the basis of a tilt angle of the two-wheeler. The tilt angle can describe the tilt. The tilt can be understood as a deviation of the two-wheeler from the vertical. The tilt angle can be detected by a tilt angle sensor of the two-wheeler. The tilt angle can also be calculated by combining multiple items of sensor information.

According to an example embodiment of the present invention, the distance function or the attention function can be degraded if the tilt is greater than a predetermined threshold value. The distance function can be degraded upward of a predetermined tilt of the two-wheeler. When driving straight ahead, the tilt of the two-wheeler is very small. Due to a continuous slight balancing movement of the two-wheeler, however, straight-ahead driving of the two-wheeler can be assumed within a tolerance range around the vertical. The threshold value for cornering can be, for example, between 10° and 30° deviation from the vertical. In particular, the threshold value can lie at a 20° deviation from the vertical.

The distance function or the attention function can be degraded proportionally to the tilt. The distance function or the attention function can be degraded more, the greater the tilt or deviation from the vertical. The distance function or the attention function can also be degraded in steps with predefined attenuation factors according to the tilt.

The distance function or the attention function can be suspended if the tilt is greater than a predetermined limit value. Upward of a certain tilt, the distance function or the attention function can be switched off. When cornering through a very tight corner, the driver is definitely focused on driving the two-wheeler. Upward of a tilt of, for example, between 35° and 55°, the distance function or the attention function can be suspended. In particular, the distance function or the attention function can be suspended upward of a tilt of 45°.

The method is preferably computer-implemented and can be implemented, for example, in software or hardware or in a mixed form of software and hardware, for example in a driver assistance system.

The present invention furthermore provides a driver assistance system for a vehicle, the driver assistance system being designed to carry out, activate or implement the steps of a variant of the method presented here in corresponding devices.

The driver assistance system can be an electrical device with at least one computing unit for processing signals or data, at least one memory unit for storing signals or data, and at least one interface and/or one communication interface for reading in or outputting data embedded in a communication protocol. The computing unit can, for example, be a signal processor, a so-called ASIC system, or a microcontroller for processing sensor signals and outputting data signals on the basis of the sensor signals. The memory unit can, for example, be a flash memory, an EPROM, or a magnetic memory unit. The interface can be designed as a sensor interface for reading in the sensor signals from a sensor and/or as an actuator interface for outputting the data signals and/or control signals to an actuator. The communication interface can be designed to read in or output the data in a wireless and/or wired manner. The interfaces may also be software modules that are present, for example, on a microcontroller in addition to other software modules.

A computer program product or a computer program with program code that can be stored on a machine-readable carrier or storage medium, such as a semiconductor memory, a hard disk memory, or an optical memory, and that is used for carrying out, implementing, and/or activating the steps of the method according to one of the embodiments described above is advantageous as well, in particular when the program product or program is executed on a computer or an apparatus.

It is pointed out that some of the possible features and advantages of the present invention are described herein with reference to different embodiments. A person skilled in the art recognizes that the features of the control device and of the method can be suitably combined, adapted, or replaced in order to arrive at further embodiments of the present invention.

BRIEF DESCRIPTION OF THE DRAWINGS

Embodiments of the present invention are described below with reference to the FIGURE, and neither the FIGURE nor the description should be construed as limiting the present invention.

FIG. 1 shows a representation of a two-wheeler with a driver assistance system according to an exemplary embodiment of the present invention.

The FIGURE is merely schematic and not true to scale. Identical reference signs refer to identical or identically acting features.

DETAILED DESCRIPTION OF EXAMPLE EMBODIMENTS

FIG. 1 shows a representation of a two-wheeler 100 with a driver assistance system 102 according to an exemplary embodiment of the present invention. The driver assistance system 102 has a distance function 104. While the distance function 104 is activated, a driver 106 of the two-wheeler 100 specifies a speed of the two-wheeler 100 via a driver's request 108. The driver's request 108 is read in by means of a throttle grip or a twist-grip throttle and/or brake control elements of the two-wheeler 100. The distance function 104 is configured to maintain a distance 110 of the two-wheeler 100 from a preceding target object 112 at least as large as a speed-dependent safety distance 114. For this purpose, the driver assistance system 102 reads in distance information 116 from a distance sensor of the two-wheeler 100. The distance sensor detects objects in a detection region in front of the two-wheeler 100. The distance sensor also detects the target object 112 and describes the distance 110 between the two-wheeler 100 and the target object 112 in the distance information 116.

The distance function 104 compares the distance 110 with the speed-dependent safety distance 114. If the distance 110 approaches the safety distance 114 such that it would fall below same, the distance function 104 activates a system intervention 118 in a brake system and/or a drive system of the two-wheeler 100 in order to decelerate the two-wheeler 100.

The system intervention 118 is superimposed on the driver's request 108 of the driver 106. A desired acceleration is reduced by the system intervention 118. A desired deceleration is reinforced by the system intervention 118.

In the approach presented here, the distance function 104 is degraded when cornering 120 is detected. In this case, for example, the safety distance 114 is reduced during cornering 120. Alternatively or additionally, the system interventions 118 can be attenuated during cornering 120. In order to prevent abrupt changes in the strength of the system interventions 118 at the beginning and end of cornering 120, the safety distance 114 and/or the system interventions 118 can be ramped down, i.e., reduced via a ramp and ramped up, i.e., increased again via a ramp.

The driver assistance system 102 also has an attention function 122. The attention function 122 is configured to direct the attention of the driver 106 to a traffic situation around the two-wheeler 100 using weak system interventions 118 when the distance 110 is less than an attention distance 124. The attention distance 124 is greater than the safety distance 114. A jerk that is clearly perceived by the driver 106 is generated by a weak system intervention 118. The jerk is perceptible independently of an ambient volume.

In one exemplary embodiment, the attention function 122 is degraded when cornering 120 is detected. For example, the attention distance 124 is reduced during cornering 120. Alternatively or additionally, the attenuated system interventions 118 can be further attenuated during cornering 120.

In one exemplary embodiment, the distance function 104 and/or the attention function 122 are degraded or attenuated according to a tilt 126 of the two-wheeler 100. The tighter the cornering 120, the greater the tilt 126 or tilt angle of the two-wheeler 100.

In this case, the distance function 104 and/or the attention function 122 can be attenuated upward of a predetermined threshold value 128. If the tilt 126 is smaller than the threshold value 128, straight-ahead driving of the two-wheeler 100 is assumed.

In one exemplary embodiment, the greater the tilt 126, the more the distance function 104 and/or the attention function 122 are attenuated. As a result, the attenuation can be greater with tighter corners than with wide corners.

In one exemplary embodiment, the distance function 104 and/or the attention function 122 are deactivated or suspended upward of a predetermined limit value 130 of the tilt.

Possible embodiments of the present invention are summarized again below or described using slightly different words.

A suppression of the system intervention of the DDA (Dynamic Drive Assist) function in a two-wheeler during cornering is presented.

Vehicles can have different driver assistance systems which offer the driver increased comfort and more safety (such as Adaptive Cruise Control (ACC) and Highway Assist (HWA)).

Furthermore, further assistance systems improve safety by means of distance warnings and emergency braking interventions. In the case of a driver-oriented assistance function referred to as a "Dynamic Drive Assist" (DDA), the driver is, above all, relieved of braking by pedal to a great extent, while the accelerator pedal is left to him.

The DDA function can be explicitly activated by the driver (similarly to ACC). In some cases, automatic activation is also possible. By means of the approach presented here, the function can also be used for two-wheelers. In this case, the focus is on informing the driver of a possible collision (when the driver is not paying attention) by means of a "smooth" deceleration.

The main objective in two-wheelers is to inform an inattentive driver of a possible impact with the preceding vehicle by means of a "smooth" deceleration. This is primarily necessary during (more or less) straight-ahead driving. Here, a "smooth" deceleration by the system is not critical with regard to vehicle stability. In the case of a tilt, an (adapted) slight deceleration by the system is also possible without endangering the vehicle stability. Nevertheless, such an intervention often does not feel very comfortable for the driver.

Since correct object detection and selection by means of an environmental sensor system (for example by a radar sensor system) in two-wheeled vehicles do not provide the same robustness during cornering as while driving straight ahead, the system sometimes "spontaneously" causes a vehicle deceleration by the system. This is often uncomfortable for the driver.

Furthermore, a two-wheeler driver always pays attention to the course of the road and to the preceding traffic while driving through a corner. The distance from the preceding vehicle is dependent on the personal risk estimation of the driver and also on whether the preceding vehicle may also be a friend also on a two-wheeler, such as in a motorcycle convoy.

In the approach presented here, the vehicle deceleration by the system is always automatically deactivated in the two-wheeler as soon as the vehicle is in a corner. This can be detected by means of tilt sensors and acceleration sensors.

The driver of the two-wheeler is attentive when cornering. Therefore, DDA system support is not necessary here. During transfer from driving straight ahead to cornering, a possible deceleration by the system is therefore suspended. During transfer from cornering to driving straight ahead, a deceleration by the system is restored (if necessary) in a "jerk free" manner.

Assuming that the driver of a two-wheeler is focused and not distracted, in terms of taking account of the preceding traffic, during cornering, an unnecessary system intervention (deceleration) can be prevented/reduced. For this purpose, the deceleration by the system is suspended or prevented when cornering is detected.

A brief detection or a brief detection loss of a preceding vehicle during cornering therefore does not lead to uncomfortable system behavior.

The driver of the two-wheeler can manually maintain his personally selected distance from the person in front without being influenced by the system (the DDA function). In the approach presented here, the function (DDA), in the case of a two-wheeler, intervenes by means of vehicle deceleration or acceleration reduction during straight-ahead driving, but this system reaction remains off during cornering.

Finally, it should be pointed out that terms like "having," "comprising," etc. do not exclude other elements or steps and terms like "a" or "an" do not exclude a plurality. Reference signs are not to be considered as limiting.

What is claimed is:

1. A method for operating a vehicle with a driver assistance system, the method comprising the following steps:
   regulating, using a distance function of the driver assistance system, a distance from a preceding target object using system interventions in a brake system and/or a drive system of the vehicle to a speed-dependent safety distance;
   degrading the distance function during cornering of the vehicle, wherein the distance function is degraded according to a tilt of the vehicle, and wherein the distance function is suspended when the tilt is greater than a predetermined limit value.

2. The method according to claim 1, wherein a safety distance is reduced during cornering.

3. The method according to claim 1, wherein the system interventions are attenuated during cornering.

4. The method according to claim 1, wherein the distance function is degraded when the tilt is greater than a predetermined threshold value.

5. A method for operating a vehicle with a driver assistance system, the method comprising the following steps:
   regulating, using a distance function of the driver assistance system, a distance from a preceding target object using system interventions in a brake system and/or a drive system of the vehicle to a speed-dependent safety distance;
   degrading the distance function during cornering of the vehicle, wherein the distance function is degraded according to a tilt of the vehicle, and wherein the distance function is degraded proportionally to the tilt.

6. A method for operating a vehicle with a driver assistance system, the method comprising the following steps:
   regulating, using a distance function of the driver assistance system, a distance from a preceding target object using system interventions in a brake system and/or a drive system of the vehicle to a speed-dependent safety distance;
   degrading the distance function during cornering of the vehicle, wherein an attention function of the driver assistance system directs attention of a driver of the vehicle to a traffic situation using low-threshold system interventions in the brake system and/or the drive system when the distance falls below a speed-dependent attention distance, wherein the attention function is degraded during cornering.

7. The method according to claim 6, wherein the attention distance is reduced during cornering.

8. A driver assistance system for a vehicle, the driver assistance system configured to:
   regulate, using a distance function of the driver assistance system, a distance from a preceding target object using system interventions in a brake system and/or a drive system of the vehicle to a speed-dependent safety distance;

degrade the distance function during cornering of the vehicle, wherein the distance function is degraded according to a tilt of the vehicle, and wherein the distance function is suspended when the tilt is greater than a predetermined limit value.

9. A non-transitory machine-readable storage medium on which is stored a computer program for operating a vehicle with a driver assistance system, the computer program, when executed by a processor, causing the processor to perform the following steps:

regulating, using a distance function of the driver assistance system, a distance from a preceding target object using system interventions in a brake system and/or a drive system of the vehicle to a speed-dependent safety distance;

degrading the distance function during cornering of the vehicle, wherein the distance function is degraded according to a tilt of the vehicle, and wherein the distance function is suspended when the tilt is greater than a predetermined limit value.

* * * * *